United States Patent
Yamamoto et al.

(10) Patent No.: US 12,515,965 B2
(45) Date of Patent: Jan. 6, 2026

(54) METHOD OF PRODUCING NICKEL SULFATE

(71) Applicant: PRIME PLANET ENERGY & SOLUTIONS, INC., Tokyo (JP)

(72) Inventors: Yuji Yamamoto, Toyota (JP); Takeru Moriyama, Nagoya (JP); Tomoaki Nakatani, Nagoya (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 634 days.

(21) Appl. No.: 17/937,121

(22) Filed: Sep. 30, 2022

(65) Prior Publication Data

US 2023/0115237 A1   Apr. 13, 2023

(30) Foreign Application Priority Data

Oct. 4, 2021 (JP) .................................. 2021-163561

(51) Int. Cl.
*C01G 53/10* (2006.01)

(52) U.S. Cl.
CPC .......... *C01G 53/10* (2013.01); *C01P 2004/61* (2013.01); *C01P 2004/62* (2013.01)

(58) Field of Classification Search
CPC ... C01G 53/10; C01P 2004/61; C01P 2004/62
USPC ........................................................ 423/544
See application file for complete search history.

(56) References Cited

U.S. PATENT DOCUMENTS

| | | | |
|---|---|---|---|
| 3,002,814 A | 10/1961 | Rovert | |
| 9,790,099 B2 * | 10/2017 | Yonesato | ............... C01G 53/04 |
| 10,329,163 B2 * | 6/2019 | Yonesato | ............... C01G 53/04 |
| 2005/0265910 A1 | 12/2005 | Kobayashi et al. | |
| 2016/0145714 A1 * | 5/2016 | Liddell | ..................... C25C 1/20 75/421 |

FOREIGN PATENT DOCUMENTS

| | | | |
|---|---|---|---|
| AU | 2012341556 A1 * | 6/2014 | ............. C01G 53/10 |
| AU | 2019-290870 A1 | 12/2019 | |
| CN | 107673415 A | 2/2018 | |
| CN | 107935063 A | 4/2018 | |
| CN | 109205687 A | 1/2019 | |
| CN | 109279666 A | 1/2019 | |
| CN | 109279667 A | 1/2019 | |
| CN | 110092423 A | 8/2019 | |
| EP | 1 752 550 A1 | 2/2007 | |
| JP | 2005-350766 A | 12/2005 | |
| JP | 5060033 B | 10/2012 | |
| JP | 2013-112538 A | 6/2013 | |
| JP | 2020-033615 A | 3/2020 | |
| WO | WO 2005/116279 A1 | 12/2005 | |
| WO | WO 2019-244527 A1 | 12/2019 | |

* cited by examiner

*Primary Examiner* — Cam N. Nguyen
(74) *Attorney, Agent, or Firm* — Finnegan, Henderson, Farabow, Garrett and Dunner, LLP

(57) ABSTRACT

Provided is a novel method of producing nickel sulfate from nickel oxide. The method of producing nickel sulfate herein disclosed includes a step of feeding nickel oxide particles and an acid aqueous solution into a pressure resistant container, a step of heating the pressure resistant container in a sealed state to a temperature exceeding 100° C. to obtain a mixed liquid in which nickel oxide is dissolved, and a step of forming nickel sulfate, using the mixed liquid.

6 Claims, 1 Drawing Sheet

METHOD OF PRODUCING NICKEL SULFATE

BACKGROUND OF THE INVENTION

1. Field of the Invention

The present disclosure relates to a method of producing nickel sulfate. The present application claims the priority based on Japanese Patent Application No. 2021-163561 filed on Oct. 4, 2021, the entire contents of which are incorporated in the present specification by reference.

2. Description of the Related Art

Recently, demand for a lithium ion secondary battery is increased more and more. Many positive electrode active materials of the lithium ion secondary battery are substances contains nickel, such as lithium nickel cobalt manganese type composite oxide, and lithium nickel cobalt aluminum type composite oxide. On the other hand, nickel is used for a stainless steel, a special steel, or the like, and demand for them is also increased.

Thus, demand for nickel is increased rapidly, and thus, from a perspective of stably supplying the nickel source, it is desired to develop a method for securing a new nickel source. As one method for securing the nickel source, a method is known that collects nickel from an oxidized ore containing nickel (for example, see Patent Document 1).

CITATION LIST

Patent Document

[Patent Document 1] Japanese Patent No. 5060033

SUMMARY OF THE INVENTION

The method described in Patent Document 1 is intended to secure the nickel source for the stainless steel, and therefore, nickel is finally obtained in a form of ferronickel. On the other hand, as the nickel source for the positive electrode active material containing nickel, nickel sulfate is generally used. Thus, a method capable of producing nickel sulfate from a raw material (for example, nickel oxide) containing nickel is very useful for securing the nickel source for the positive electrode active material of the lithium ion secondary battery.

In the view of forgoing, it is an object of the present disclosure to provide a novel method for producing nickel sulfate from nickel oxide.

A method of producing nickel sulfate herein disclosed includes a step of feeding nickel oxide particles and an acid aqueous solution into a pressure resistant container; a step of heating the pressure resistant container in a sealed state to a temperature exceeding 100° C. to obtain a mixed liquid in which nickel oxide is dissolved; and a step of forming nickel sulfate, using the mixed liquid. According to this configuration, it is possible to provide a novel method of producing nickel sulfate from a raw material containing nickel oxide.

In one desirable aspect of the production method of nickel sulfate herein disclosed, the acid aqueous solution is hydrochloric acid. According to this configuration, the dissolution speed of nickel oxide into the acid aqueous solution becomes larger, and thus it is possible to enhance the production efficiency for nickel sulfate.

In one desirable aspect of the production method of nickel sulfate herein disclosed, an average particle diameter of the nickel oxide particles is 1.0 mm or less. According to this configuration, the dissolution speed of nickel oxide into the acid aqueous solution becomes larger, and thus it is possible to enhance the production efficiency for nickel sulfate. Furthermore, in a case where the average particle diameter of the nickel oxide particles is not less than 0.5 μm and not more than 100 μm, the dissolution speed of nickel oxide into the acid aqueous solution further becomes larger, and thus it is possible to further enhance the production efficiency for nickel sulfate.

In one desirable aspect of the production method of nickel sulfate herein disclosed, a concentration of the acid aqueous solution is 2 mol/L or more. In addition, the particles are fed into the pressure resistant container so that a concentration of nickel oxide is 0.80 mol/L or less. According to this configuration, the dissolution speed of nickel oxide into the acid aqueous solution becomes larger, and thus it is possible to enhance the production efficiency for nickel sulfate. Furthermore, in a case where the feeding is performed so that the concentration of nickel oxide is not less than 0.30 mol/L and not more than 0.60 mol/L, the dissolution speed of nickel oxide into the acid aqueous solution further becomes larger, and thus it is possible to further enhance the production efficiency for nickel sulfate.

In one desirable aspect of the production method of nickel sulfate herein disclosed, the pressure resistant container is heated in the sealed state to a temperature of not less than 150° C. and not more than 270° C. According to this configuration, the dissolution speed of nickel oxide into the acid aqueous solution becomes larger, and thus it is possible to enhance the production efficiency for nickel sulfate. In addition, this configuration is excellent in the cost, too.

DESCRIPTION OF THE PREFERRED EMBODIMENTS

Figure 1:
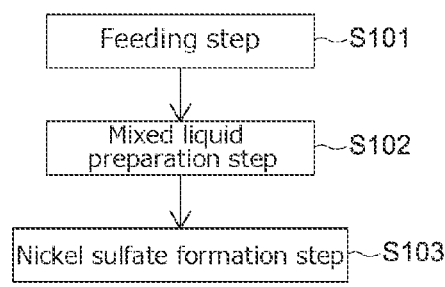
FIG. 1 is a flowchart that shows each step of a method of producing nickel sulfate in accordance with the present disclosure.

Hereinafter, embodiments in accordance with the present disclosure will be explained with reference to accompanying drawings. It should be noted that matters which are not specifically mentioned in the present specification and are necessary for implementation of the present disclosure can be understood as design matters of those skilled in the art based on the conventional art in the field. The present disclosure can be carried out based on the contents disclosed in the present specification, and on the technical common sense in the relevant technical field.

FIG. 1 shows each step of a method of producing nickel sulfate in accordance with the present embodiment. The method of producing nickel sulfate in accordance with the present embodiment includes a step S101 (hereinafter, also referred to as "feeding step") of feeding nickel oxide particles and an acid aqueous solution into a pressure resistant container, a step S102 (hereinafter, also referred to as "mixed liquid preparation step") of heating the pressure resistant container in a sealed state to a temperature exceeding 100° C. to obtain mixed liquid in which nickel oxide is dissolved, and a step S103 (hereinafter, also referred to as "nickel sulfate formation step") of forming nickel sulcate, using the mixed liquid. Hereinafter, each step will be described in details.

<Feeding Step S101>

In the feeding step S101, the nickel oxide particles and the acid aqueous solution are fed into the pressure resistant container. As the pressure resistant container, a known pressure resistant container used for chemical reaction can be used. A specific example thereof includes an autoclave, a pressure tank, and a pressure chamber. It is desirable that the pressure resistant container includes a temperature measuring means such as a thermometer and a temperature sensor.

The nickel oxide particles are available as a commercial product, and may be a reagent grade product or an industry grade product.

As a particle diameter of the nickel oxide particles is smaller, a dissolution speed of the nickel oxide particles become larger. In other words, as the particle diameter of the nickel oxide particles are larger, the dissolution speed becomes smaller. Therefore, an average particle diameter of the nickel oxide particles is, for example, 2.5 mm or less, desirably 1.0 mm or less, more desirably 500 µm or less, still more desirably 200 µm or less, and the most desirably 100 µm or less. On the other hand, when the average particle diameter of the nickel oxide particles is too small, it is not easy to perform fine grinding for obtaining a desired average particle diameter. Thus, the particle diameter of the nickel oxide particles is, for example, 0.1 µm or more, desirably 0.2 µm or more, more desirably 0.3 µm or more, and still more desirably 0.5 µm or more.

It should be noted that the average particle diameter of the nickel oxide particles in the present specification means a median diameter D50. Thus, the average particle diameter can be determined, for example, by measuring a particle size distribution of the particles on a volume basis with a laser diffraction or scattering method, and obtaining a particle diameter corresponding to cumulative frequency 50 volume % from a fine particle side (i.e., a small particle diameter side).

As the acid contained in the acid aqueous solution, which is not particularly restricted, inorganic acid is desirable, and an example thereof includes hydrogen chloride (HCl), sulfuric acid ($H_2SO_4$), nitric acid ($HNO_3$), phosphoric acid ($H_3PO_4$). Among them, the sulfuric acid has an advantage that a sulfuric acid ion ($SO_4^{2-}$), which is an anion of nickel sulfate, can be introduced into the system. On the other hand, the hydrogen chloride is supposed to be able to form a complex with nickel, and has an advantage that the dissolution speed of the nickel oxide particles is particularly large. Thus, the hydrochloric acid is desirable as the acid aqueous solution.

As an acid concentration of the acid aqueous solution is higher, the dissolution speed of the nickel oxide particles is larger. Thus, the acid concentration of the acid aqueous solution is desirably 1.8 mol/L (1.8 M) or more, and more desirably 2.0 mol/L or more. On the other hand, when the acid concentration of the acid aqueous solution becomes too high, a disadvantage on the cost might be caused. Thus, the acid concentration of the acid aqueous solution is desirably 20 mol/L or less, and more desirably 5.0 mol/L or less.

Regarding feed amounts of the nickel oxide particles and the acid aqueous solution, the dissolution speed tends to be larger as the amount of the nickel oxide particles is smaller. Thus, it is desirable that these are fed so that a concentration of nickel oxide is 1.0 mol/L or less. This concentration of nickel oxide is more desirably 0.8 mol/L or less, and still more desirably 0.6 mol/L or less. On the other hand, when this concentration of nickel oxide is smaller, a collecting amount of nickel sulfate per one implementation of the method becomes smaller so as to cause a disadvantage on cost. Thus, this concentration of nickel oxide is desirably 0.1 mol/L more, more desirably 0.2 mol/L or more, and still more desirably 0.3 mol/L or more.

In one desirable embodiment, from a perspective of the high solubility of nickel oxide, a concentration of the acid aqueous solution is 2 mol/L or more, and in addition, the nickel oxide particles are fed into the pressure resistant container so that a concentration of nickel oxide is 0.80 mol/L or less.

The method of feeding the nickel oxide particles and the acid aqueous solution into the pressure resistant container is not particularly restricted, and thus known methods may be used. Regarding the nickel oxide particles and the acid aqueous solution, any of them may be firstly fed into the pressure resistant container or both of them may be fed simultaneously.

<Mixed Liquid Preparing Step S102>

In the mixed liquid preparing step S102, heating in a state where the pressure resistant container is sealed is performed to the temperature exceed 100° C., so as to obtain mixed liquid in which nickel oxide is dissolved.

Therefore, at first, the pressure resistant container into which the nickel oxide particles and the acid aqueous solution have been fed is scaled. Then, heating is performed to the temperature exceed 100° C.

The heating can be performed in accordance with a known method. For example, a method of immersing the pressure resistant container in an oil bath for heating, a method of winding a belt heater such as a ribbon heater, or winding a sheet heater such as a film heater and a silicon rubber heater, on the pressure resistant container for heating can be employed.

Here, nickel oxide is a chemical compound that is hardly dissolved, and nickel oxide cannot be dissolved in the acid aqueous solution even with heating at 100° C. under an atmospheric pressure. Thus, in the present embodiment, heating at a temperature exceeding 100° C. is performed. Since the pressure resistant container is in the sealed state, this heating can make the inside of the pressure resistant container be in a pressurized state, and thus it is possible to dissolve nickel oxide into the acid aqueous solution. Therefore, by this heating, it is possible to obtain a mixed liquid in which nickel oxide is dissolved in the acid aqueous solution.

Here, as the heating temperature is higher, the dissolution speed of nickel oxide becomes larger. Thus, the heating temperature is desirably 110° C. or more, more desirably 150° C. or more, still more desirably 180° C. or more, or the most desirably 200° C. or more. However, in a range of a high heating temperature, a dissolution speed increasing effect for nickel oxide becomes very small and in addition, excessive heating will cause cost increase. Thus, the heating temperature, which is not particularly restricted, is desirably 270° C. or less, and more desirably 250° C. or less.

The heating time is significantly dependent on the heating temperature and the kind of the acid. Thus, the heating time may be appropriately selected, depending on the heating temperature and the kind of the acid so as to be a time for sufficiently dissolving the nickel oxide particles into the acid aqueous solution.

<Nickel Sulfate Formation Step S103>

In the nickel sulfate formation step S103, using the mixed liquid obtained as described above, nickel sulfate is formed. This step can be performed in accordance with a known method.

In a case where a sulfuric acid aqueous solution is used as the acid aqueous solution, there are nickel ions and sulfuric acid ions in the mixed liquid. In that case, for example, an alkali aqueous solution (for example, a sodium hydroxide aqueous solution, or the like) is at first used to adjust pH of the mixed liquid. Suitably, the pH is around 4. Next, a solid-liquid separation is performed in accordance with a known method, so as to separate a solid phase and a liquid phase (in other words, water phase).

From the separated water phase, nickel sulfate is crystallized in accordance with a known method. Then, nickel sulfate precipitated is collected in accordance with a known method, and thereby nickel sulfate can be obtained.

In a case where an aqueous solution other than the sulfuric acid aqueous solution is used as the acid aqueous solution, there are nickel ions but not sulfuric acid ions in the mixed liquid. In that case, for example, an extracting agent (for example, alkyl phosphonic acid ester, or the like) is added at first to the mixed liquid and then the resultant is stirred. Thereafter, alkali (for example, sodium hydroxide) is added, and the pH is thereby adjusted to allow the nickel ions to move into the organic phase. After that, the organic phase is extracted. Then, a sulfuric acid aqueous solution is added to the extracted organic phase. By doing this, the nickel ions move into a water phase containing the sulfuric acid. This water phase is extracted, and then, nickel sulfate is crystallized in accordance with a known method. Thereafter, nickel sulfate is collected in accordance with a known method, and thereby nickel sulfate can be obtained.

It should be noted that, depending on the use purpose of nickel sulfate, for example, nickel sulfate may be collected in a form of an aqueous solution without precipitating nickel sulfate from the water phase.

As described above, it is possible to produce nickel sulfate from a nickel oxide particles. The method of producing nickel sulfate in accordance with the present embodiment is novel, and is extremely beneficial as a novel method for securing nickel sulfate used as the nickel source for the positive electrode active material of the lithium ion secondary battery.

Examples relating to the present disclosure will be explained in detail hereafter, but the disclosure is not meant to be limited to the particulars described in such examples.

Example 1

In Example 1, nickel oxide particles whose average particle diameter (D50) is 500 μm were used. It should be noted that as for the nickel oxide particles, particles in which the Ni content was not less than 75 mass %, the Fe content was not more than 1 mass % and the S content was not more than 0.08 mass % was used.

The nickel oxide particles and a sulfuric acid having a concentration of 2 mol/L were fed into the autoclave so that a concentration of nickel oxide was 0.8 mol/L. The autoclave was sealed and heated to 110° C. with a heater.

After the heating was performed for 30 minutes, undissolved nickel oxide particles were collected from the mixed liquid in the autoclave and the weight of the undissolved nickel oxide particles was determined. It was confirmed that the weight was reduced and the nickel oxide particles were dissolved into the acid aqueous solution. Furthermore, based on the reduction amount of the weight, the dissolution speed of nickel oxide per 30 minutes (%/30 minutes) was calculated. This dissolution speed is shown in Table 1.

In addition, the pH of the mixed liquid in which nickel oxide was dissolved was adjusted by using sodium hydroxide so as to be about 4. Then, by a solid-liquid separation, the liquid phase was collected and the liquid phase was fed into a crystallizer. The inside pressure thereof was controlled by using a vacuum pump so that the inside pressure was about 7.5 kPa, and crystallization was performed while the inside of the crystallizer was stirred with a double propeller. Thereby, nickel sulfate was formed. This resultant was collected and thus, nickel sulfate was obtained.

Examples 2 to 12

Nickel sulfate was obtained in a manner similar to Example 1, except that the average particle diameter (D50) of the nickel containing particles, the concentration of nickel oxide, the concentration of the acid aqueous solution, and the heating temperature were changed to the values shown in Table 1. At that time, the dissolution speed of nickel oxide per 30 minutes was determined. The result was shown in Table 1.

Examples 13 to 17

In Examples 13 to 17, the nickel oxide particles having an average particle diameter (D50) shown in Table 1 were used. The nickel oxide particles and the hydrochloric acid having a concentration of 2 mol/L were fed into the autoclave so that a concentration of nickel oxide was 0.4 mol/L. The autoclave was sealed and heated to 180° C. with a heater.

After the heating was performed for 30 minutes, undissolved nickel oxide particles were collected from the mixed liquid in the autoclave and the weight of the undissolved nickel oxide particles was determined. It was confirmed that the weight was reduced and the nickel oxide particles were dissolved into the acid aqueous solution. Furthermore, based on the reduction amount of the weight, the dissolution speed of nickel oxide per 30 minutes was calculated. This dissolution speed is shown in Table 1.

In addition, alkyl phosphonic acid ester was added as an extracting agent to the mixed liquid in which nickel oxide was dissolved, and the resultant was stirred. Then, the pH thereof was adjusted by using sodium hydroxide so as to allow nickel ions to move into an organic phase, and the organic phase was extracted.

A sulfuric acid aqueous solution was added to the extracted organic phase, and a water phase was extracted. The water phase was fed into the crystallizer, and the inside pressure of the crystallizer was controlled by using a vacuum pump so that the inside pressure was about 7.5 kPa. Crystallization was performed while the inside of the crystallizer was stirred with a double propeller. Thereby, nickel sulfate was formed. This resultant was collected and thus, nickel sulfate was obtained.

Comparative Examples 1 and 2

The nickel oxide particles and the sulfuric acid having a concentration of 2 mol/L were fed into the autoclave so that a concentration of nickel oxide was 0.8 mol/L. The autoclave was sealed and heated to a temperature shown in Table 1. After the heating was performed for 30 minutes, undissolved nickel oxide particles were collected from the mixed liquid in the autoclave, and the weight of the undissolved nickel oxide particles was determined. The weight was not reduced, and the nickel oxide particles were not dissolved.

Comparative Example 3

The nickel oxide particles and the sulfuric acid having a concentration of 2 mol/L were fed into the autoclave so that a concentration of nickel oxide was 0.8 mol/L. The autoclave was not sealed, but heated to 110° C. with the heater. After the heating was performed for 30 minutes, undissolved nickel oxide particles were collected from the mixed liquid in the autoclave, and the weight of the undissolved nickel oxide particles was determined. The weight was not reduced, and the nickel oxide particles were not dissolved.

TABLE 1

|  | Average particle diameter (μm) | NiO concentration (mol/L) | Acid | Acid concentration (mol/L) | Container | Heating temperature (° C.) | Dissolution speed (%/30 min.) |
|---|---|---|---|---|---|---|---|
| Example 1 | 500 | 0.8 | $H_2SO_4$ | 2 | Sealed | 110 | 3.0 |
| Example 2 | 1000 | 0.8 | $H_2SO_4$ | 2 | Sealed | 110 | 2.8 |
| Example 3 | 500 | 0.8 | $H_2SO_4$ | 5 | Sealed | 110 | 3.1 |
| Example 4 | 500 | 0.8 | $H_2SO_4$ | 18 | Sealed | 110 | 3.3 |
| Example 5 | 500 | 0.8 | $H_2SO_4$ | 2 | Sealed | 150 | 8.5 |
| Example 6 | 500 | 0.8 | $H_2SO_4$ | 2 | Sealed | 180 | 14.3 |
| Example 7 | 500 | 0.8 | $H_2SO_4$ | 2 | Sealed | 230 | 24.5 |
| Example 8 | 500 | 0.8 | $H_2SO_4$ | 2 | Sealed | 250 | 30.0 |
| Example 9 | 500 | 0.8 | $H_2SO_4$ | 2 | Sealed | 270 | 31.0 |
| Example 10 | 500 | 0.6 | $H_2SO_4$ | 2 | Sealed | 250 | 35.0 |
| Example 11 | 500 | 0.4 | $H_2SO_4$ | 2 | Sealed | 250 | 40.0 |
| Example 12 | 500 | 0.3 | $H_2SO_4$ | 2 | Sealed | 250 | 40.0 |
| Example 13 | 500 | 0.4 | HCl | 2 | Sealed | 180 | 50.0 |
| Eample 14 | 100 | 0.4 | HCl | 2 | Sealed | 180 | 55.0 |
| Example 15 | 50 | 0.4 | HCl | 2 | Sealed | 180 | 57.0 |
| Example 16 | 5 | 0.4 | HCl | 2 | Sealed | 180 | 60.0 |
| Example 17 | 0.5 | 0.4 | HCl | 2 | Sealed | 180 | 61.0 |
| Comparative example 1 | 500 | 0.8 | $H_2SO_4$ | 2 | Sealed | 70 | 0.0 |
| Comparative example 2 | 500 | 0.8 | $H_2SO_4$ | 2 | Sealed | 100 | 0.0 |
| Comparative example 3 | 500 | 0.8 | $H_2SO_4$ | 2 | Opened | 110 | 0.0 |

From the results described above, it can be understood that, by heating nickel oxide particles and an acid aqueous solution in a sealed pressure resistant container to a temperature exceeding 100° C., a mixed liquid in which nickel oxide is dissolved can be prepared and, by using the mixed liquid, nickel sulfate can be formed. Therefore, it can be understood that nickel sulfate can be produced from nickel oxide according to the production method herein disclosed.

Concrete examples of the present disclosure have been explained in detail above, but the examples are merely illustrative in nature, and are not meant to limit the scope of the claims in any way. The art set forth in the claims encompasses various alterations and modifications of the concrete examples illustrated above.

What is claimed is:

1. A method of producing nickel sulfate, the method comprising:
    a step of feeding nickel oxide particles and an acid aqueous solution into a pressure resistant container;
    a step of heating the pressure resistant container in a sealed state to a temperature exceeding 100° C. to obtain a mixed liquid in which nickel oxide is dissolved; and
    a step of forming nickel sulfate, from the mixed liquid, wherein the acid aqueous solution is hydrochloric acid.
2. The method according to claim 1,
    wherein an average particle diameter of the nickel oxide particles is 1.0 mm or less.
3. The method according to claim 2,
    wherein the average particle diameter of the nickel oxide particles is not less than 0.5 μm and not more than 100 μm.
4. The method according to claim 1,
    wherein a concentration of the acid aqueous solution is 2 mol/L or more, and
    the particles are fed into the pressure resistant container so that a concentration of nickel oxide is 0.80 mol/L or less.
5. The method according to claim 4,
    wherein the particles are fed into the pressure resistant container so that the concentration of nickel oxide is not less than 0.3 mol/L and not more than 0.60 mol/L.

6. The method according to claim 1,
wherein the pressure resistant container is heated in the sealed state to a temperature of not less than 150° C. and not more than 270° C.

\* \* \* \* \*